J. COLLMAN & J. COLLMAN, Jr.
Nut Locks.

No. 200,513. Patented Feb. 19, 1878.

WITNESSES

INVENTORS
John Collman
John Collman, Jr.

ATTORNEYS

UNITED STATES PATENT OFFICE.

JOHN COLLMAN AND JOHN COLLMAN, JR., OF CEDAR RAPIDS, IOWA.

IMPROVEMENT IN NUT-LOCKS.

Specification forming part of Letters Patent No. 200,513, dated February 19, 1878; application filed January 19, 1878.

*To all whom it may concern:*

Be it known that we, JOHN COLLMAN and JOHN COLLMAN, Jr., of Cedar Rapids, in the county of Linn and State of Iowa, have invented a new and valuable Improvement in Nut-Locks; and we do hereby declare that the following is a full, clear, and exact description of the construction and operation of the same, reference being had to the annexed drawings, making a part of this specification, and to the letters and figures of reference marked thereon.

Figure 1:
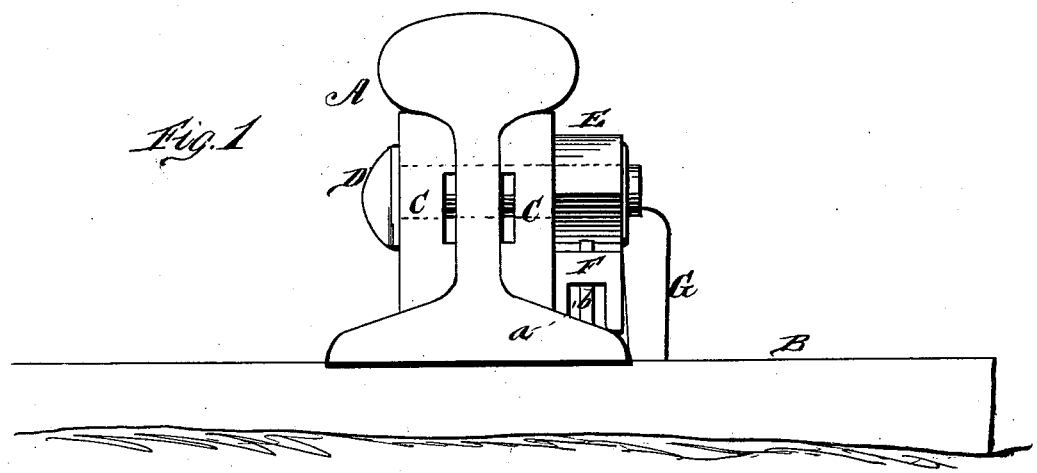
Figure 2:
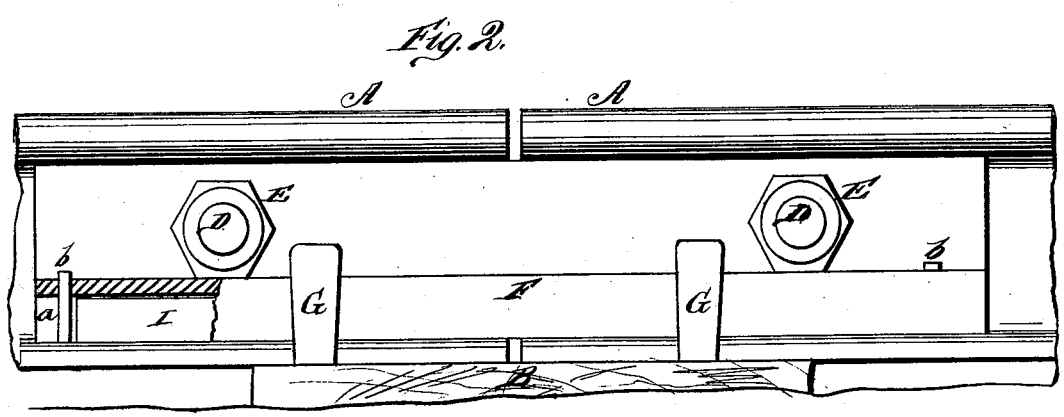

Figure 1 of the drawings is a representation of an end view of rail, showing our nut-lock; and Fig. 2 is a part sectional side view of the same.

Our present invention is intended as an improvement upon the nut-lock for which Letters Patent No. 197,606 were granted to us November 27, 1877; and it has for its object to adapt the principle of our nut-locking device to the ordinary fish-bars now in use.

The nature of our invention consists in an iron bar placed under the nuts on the rails and held by spikes, with a smaller bar placed or driven under said iron bar and held at the ends by pins, all as hereinafter more fully set forth.

The annexed drawing, to which reference is made, fully illustrates our invention.

A A represent the ends of two adjoining railroad-rails, resting on the tie B. C C are the ordinary fish-plates. D D are the bolts, and E E the nuts, all the same as ordinarily in use. Under the nuts E, and resting on the feet of the rails A A, is a longitudinal bar, F, which is held in place by means of ordinary railroad-spikes G G, driven into the tie B. The iron bar F has a longitudinal groove, *a*, in its under side, and into this groove, from either end, is driven a smaller bar, I, to enable the workmen to make a tight fit on any size of rails, or, in other words, to make the bar F come up close to the under sides of the nuts. The bar I is then held in place by two iron plugs, *b b*, driven through holes in the main bar F, one at each end of the bar I.

We are aware that it is not new to simply place a bar under the nuts at a railroad-rail joint, and we do, therefore, not claim such, broadly, as our invention.

What we claim as new, and desire to secure by Letters Patent, is—

In combination with the rails, fish-plates, bolts, and nuts, the grooved bar F, spikes G, bar I, and plugs *b b*, substantially as and for the purposes set forth.

In testimony that we claim the above we have hereunto subscribed our names in the presence of two witnesses.

JOHN COLLMAN.
JOHN COLLMAN, JR.

Witnesses:
A. R. WEST,
A. N. EASTMAN.